United States Patent
Stahmer et al.

(10) Patent No.: US 9,587,700 B2
(45) Date of Patent: Mar. 7, 2017

(54) ROLL-OFF PISTON FOR AN AIR SPRING ROLLING-LOBE FLEXIBLE MEMBER

(71) Applicant: ContiTech Luftfedersysteme GmbH, Hannover (DE)

(72) Inventors: Reinhard Stahmer, Neustadt am Ruebenberge (DE); Siegfried Reck, Nienburg (DE)

(73) Assignee: ContiTech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 14/518,932

(22) Filed: Oct. 20, 2014

(65) Prior Publication Data

US 2015/0035213 A1    Feb. 5, 2015

Related U.S. Application Data

(63) Continuation of application No. PCT/EP2013/053867, filed on Feb. 27, 2013.

(30) Foreign Application Priority Data

Apr. 18, 2012 (DE) .......... 10 2012 103 358

(51) Int. Cl.
  *F16F 9/04* (2006.01)
  *F16F 9/05* (2006.01)
  *B60G 11/27* (2006.01)
  *F16F 5/00* (2006.01)

(52) U.S. Cl.
  CPC .............. *F16F 9/057* (2013.01); *B60G 11/27* (2013.01)

(58) Field of Classification Search
  CPC ...... F16F 9/08; F16F 9/05; F16F 9/057; F16F 9/36; F16F 9/3214; F16F 9/0454; F16F 9/54; B60G 2202/152; B60G 2202/242; B60G 2204/126; B60G 2204/1262; B60G 11/27
  USPC .......... 267/64.19, 64.21, 64.23, 64.24, 64.27
  See application file for complete search history.

(56) References Cited

U.S. PATENT DOCUMENTS

| | | | |
|---|---|---|---|
| 4,564,177 A | | 1/1986 | Leonard |
| 4,588,171 A | * | 5/1986 | Stephens ............ F16F 9/46 188/318 |
| 4,712,776 A | * | 12/1987 | Geno ............ B60G 15/14 188/322.12 |
| 4,787,606 A | * | 11/1988 | Geno ............ F16F 9/0463 267/64.24 |

(Continued)

FOREIGN PATENT DOCUMENTS

| | | |
|---|---|---|
| DE | 89 03 264 U1 | 6/1989 |
| EP | 1 862 335 A1 | 12/2007 |
| WO | 2007/104671 A1 | 9/2007 |

OTHER PUBLICATIONS

International Search Report dated May 28, 2013 of international application PCT/EP2013/053867 on which this application is based.

*Primary Examiner* — Melody Burch
(74) *Attorney, Agent, or Firm* — Walter Ottesen, P.A.

(57) ABSTRACT

A roll-off piston is made of plastic for an air spring rolling-lobe flexible member. The roll-off piston and the air spring rolling-lobe flexible member are arranged between a sprung mass and an unsprung mass. The roll-off piston includes a first piston part; a second piston part connected to the first piston part; and, the first and second piston parts being made of a layered composite material of alternating layers of plastic and elastomeric material.

17 Claims, 4 Drawing Sheets

(56) References Cited

U.S. PATENT DOCUMENTS

| | | | |
|---|---|---|---|
| 4,890,823 A | 1/1990 | Koschinat et al. | |
| 5,024,424 A * | 6/1991 | Fejerdy | F16F 9/0454 |
| | | | 267/64.27 |
| 5,509,641 A * | 4/1996 | Prinzler | B60G 15/10 |
| | | | 267/64.19 |
| 5,549,269 A * | 8/1996 | Gertel | F16F 13/002 |
| | | | 248/619 |
| 6,349,928 B1 * | 2/2002 | Ko | B60K 11/04 |
| | | | 165/69 |
| 8,272,627 B2 * | 9/2012 | Oldenettel | F16F 9/0445 |
| | | | 267/122 |
| 2006/0170140 A1 | 8/2006 | Menk et al. | |
| 2010/0127438 A1 | 5/2010 | Eise et al. | |
| 2011/0266728 A1 * | 11/2011 | Bank | F16F 9/05 |
| | | | 267/64.27 |

* cited by examiner

ROLL-OFF PISTON FOR AN AIR SPRING ROLLING-LOBE FLEXIBLE MEMBER

CROSS REFERENCE TO RELATED APPLICATIONS

This application is a continuation application of international patent application PCT/EP2013/053867, filed Feb. 27, 2013, designating the United States and claiming priority from German application 10 2012 103 358.7, filed Apr. 18, 2012, and the entire content of both applications is incorporated herein by reference.

FIELD OF THE INVENTION

The invention relates to a roll-off piston made of plastic for an air spring rolling-lobe flexible member. The air spring rolling-lobe flexible member and the roll-off piston are arranged between a sprung and an unsprung mass, in particular between the body and the chassis of a vehicle. The roll-off piston has at least two piston parts connected to one another, in particular a substantially pot-shaped and rotationally symmetrical lower piston part and an upper piston part formed so as to be complementary thereto.

BACKGROUND OF THE INVENTION

The upper piston part usually has annular profiles and/or annular flanges, for example a sealing cone, for the abutment and airtight connection of the air spring rolling-lobe flexible member on/to the roll-off piston.

Various types of such roll-off pistons are known in the prior art. On the one hand, there are relatively heavy roll-off pistons of sheet steel with a usable interior volume, which are screwed or welded to the corresponding connection parts. The roll-off piston of sheet steel is produced as a deep-drawn part with a conical sealing seat for receiving the rolling-lobe flexible member and is accordingly heavy and expensive to produce.

On the other hand, there are relatively lightweight one-part plastic pistons with an interior volume that is not used or only partially used and molded-on or embedded fastening parts of metal, with which a connection to the connection parts can be realized. A plastic piston with a completely used interior volume is disclosed by EP 1 862 335 B1. Described there is an air spring piston which consists of a cup-shaped part and a cover part, which are butt-welded in the region of their walls.

United States patent application publication 2010/0127438 discloses a plunger piston for an air spring that is formed as a hollow body and has two parts connected to one another in an airtight manner, to be specific a pot-shaped lower part, having a base and a casing, and an upper part.

Proceeding from the known air springs with a roll-off piston made of steel, pistons made of glass fiber reinforced plastic (GRP), for instance polyamide PA 66 GF 30 have been developed with the aim of lowering weight and the costs involved in producing the pistons. However, the advantages of this material are also offset by disadvantages. These are that the material is relatively hard and brittle and can splinter if it breaks as a result of fatigue or mechanical overloading.

In particular whenever a roll-off piston consisting of glass fiber reinforced plastic is damaged, it is possible that the material will break brittlely, with the possibility of producing sharp-edged fragments and splinters.

In the case of roll-off pistons of which the interior volume is used for enlarging the working space of the air spring, the resultant risk increases, because the internal pressure can accelerate the splinters produced.

Typically, plastic pistons are produced by injection-molding processes. Such a piston produced as an injection-molded part may have weak points as a result of flow fronts, which in the case of pistons with a fully used interior volume often lie in the zones subjected to particularly high loading between the reinforcing ribs.

Moreover, at present, pistons with a fully used interior volume and conical sealing with respect to the rolling-lobe flexible member can usually only be produced as pistons of two parts that are connected to one another by friction welding. The friction weld is a point at which discontinuities of the material parameters can likewise occur, for example also because in the case of glass fiber reinforced plastics the glass fibers in the weld are not aligned, and therefore have less of a strengthening effect.

SUMMARY OF THE INVENTION

It is an object of the invention to provide a lightweight and easy-to-produce roll-off piston made of plastic, or made of glass fiber reinforced plastic (GRP) that does not give off sharp-edged splinters into the surroundings in the event of being damaged, does not have the disadvantages of a friction weld, neutralizes the effects of flow fronts in the injection-molding process and the interior volume of which can be completely used for the suspension.

The object is achieved by a roll-off piston made of plastic for an air spring rolling-lobe flexible member. The roll-off piston and the air spring rolling-lobe flexible member are arranged between a sprung mass and an unsprung mass. The roll-off piston includes a first piston part; a second piston part connected to the first piston part; and, the first and second piston parts being made of a layered composite material of alternating layers of plastic and elastomeric material.

In this case, the roll-off piston is made up of a layered composite material comprising alternating layers of plastic and elastomeric material.

The central idea is to provide a roll-off piston made of plastic or fiber reinforced plastic (GRP, CRP, carbon nanotubes of reinforced plastic) using a construction of composite material in such a way that the elastomeric material prevents a brittle breakout of plastic parts under overloading. This largely banishes the risk of fragments being thrown out in the event of the piston being damaged.

An advantageous development is that the upper piston part and the lower piston part are at least partially fitted one inside the other, with an intermediate layer of elastomeric material arranged in between. Such a formation allows two injection-molded parts to be easily assembled to form a piston.

A further advantageous formation is that the layer or intermediate layer of elastomeric material is formed as an elastomer adhesive. In the case of two concentrically arranged part-bodies of fiber reinforced plastic for example, the inner piston and the outer piston, arranged between which is an elastomeric adhesive layer that firmly connects (adhesively bonds) the two part-bodies to one another, the certainty of safeguarding against a brittle breakout of plastic parts is further increased. If one of the two part-bodies breaks or both part-bodies break, the adhesive forces securely hold the fragments on the surfaces of the elastomeric adhesive layer.

A further advantageous formation is that the layer or intermediate layer of elastomeric material includes a rubber layer, in particular a rubber layer vulcanized onto one part of the piston. As a result of its elasticity, such a layer allows a reduction in stress between the parts of the piston thereby connected, and consequently increases the load-bearing capacity and also the certainty of safeguarding against stone impact when such a piston is, for example, arranged in a chassis of a truck.

A further advantageous formation is that the roll-off piston is formed as a hollow plunger piston, the interior space of the roll-off piston being in connection with the interior space of the air spring and the roll-off piston having a pot-shaped lower piston part and an upper piston part that is connected in an airtight manner to the lower piston part by the intermediate layer of elastomeric material and is formed as a cover. In this case, the elastomeric adhesive layer and/or the rubber layer acts at the same time as a seal between the part-bodies.

Depending on the application and the collective load, further advantageous formations consist in that the upper piston part and the lower piston part are connected to one another in the form of a conical plug-in connection, in the form of a stepped plug-in connection or else in the form of a tongue-and-groove joint. Such a conical or else cylindrical or multi-stepped connection in each case improves the properties of the roll-off piston with regard to splintering resistance and durability.

The configuration of the piston according to the invention, from two part-bodies connected in such a way, increases the certainty of safeguarding against splintering in the event of it being damaged, because the elastomeric layers/adhesive layers between the part-bodies bond the fragments and splinters that are produced. The two-part construction also has the advantage that flow fronts of the part-bodies that are technically unavoidable in production can be arranged offset with respect to one another in order to increase the overall stability of the piston.

The embodiment as a combination of an inner cone and an outer cone has the advantage that the conical parts can be easily molded during production. Furthermore, the operational load causes forces in the radial direction that strengthen the conical seat and the sealing effect. The use of a number of elastomeric layers, for example by stepping or in the form of connections by tongue-and-groove joints, increases the load-bearing capacity and the certainty of safeguarding against splintering, because the fragments that may be produced are held on the larger surface or within the step formations.

A further advantage is the favorable characteristics with respect to stone impact: a crack in the outer casing does not mean that there will be a loss of pressure, because the elastomer and/or adhesive layer, in particular stepped layers or layers in tongue-and-groove joints, reliably prevent crack propagation in the plastic, and consequently prevent bursting under internal pressure.

Such a roll-off piston is particularly suitable for use in an air spring device for a vehicle, for example for a truck.

A particularly advantageous method for making such a roll-off piston comprises that, after making a first piston part, this part is provided with a vulcanized-on rubber layer and then at least one further piston part is molded onto the rubber layer by the injection-molding process. Consequently, a (second) half of the piston, which can be easily produced by the injection-molding process, is subsequently molded onto the first half of the piston, already produced by an injection-molding process, with a vulcanized-on rubber layer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
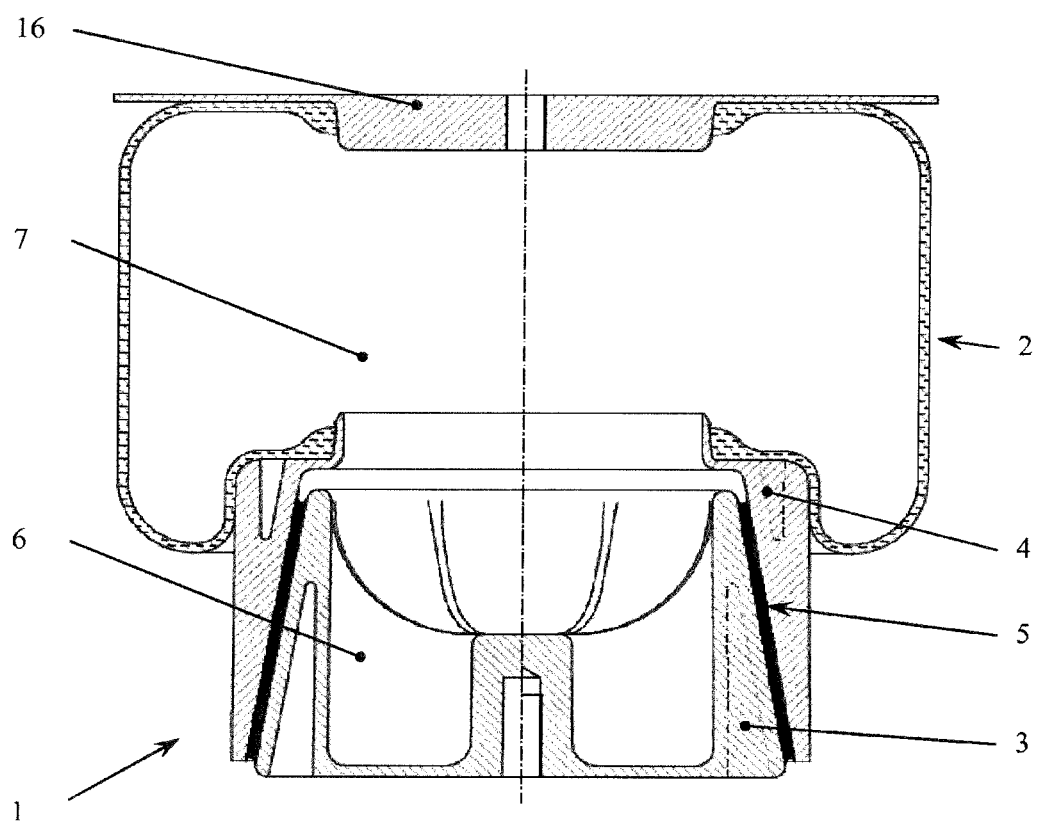
FIG. 1 shows a roll-off piston according to the invention for an air spring.

FIG. 1 shows a roll-off piston 1 according to the invention made of glass fiber reinforced plastic for an air spring rolling-lobe flexible member 2. The air spring rolling-lobe flexible member and the roll-off piston are arranged between the body and the chassis of a vehicle, the body and the chassis not being represented any more specifically here. The air spring rolling-lobe flexible member 2 is closed at its upper end by an air spring cover 16. The cover 16 has an air supply and is connected to the body of the vehicle.

The roll-off piston 1 is made of two piston parts that are connected to one another, namely, a substantially pot-shaped and rotationally symmetrical lower piston part 3 and an upper piston part 4 formed so as to be complementary thereto. The upper piston part 4 and the lower piston part 3 are fitted one inside the other, with an intermediate layer 5 of elastomeric material arranged therebetween, and thus forming a roll-off piston 1 made up of a layered composite material of alternating layers made of glass fiber reinforced plastic and elastomeric material.

The layer or intermediate layer 5 of elastomeric material is made here of a rubber layer that is respectively connected to both piston parts 3 and 4 by vulcanization.

The roll-off piston 1 is formed here as a hollow plunger piston. The interior space 6 of the roll-off piston 1 communicates with the interior space 7 of the air spring 2.

Here, the upper piston part 4 and the lower piston part 3 are connected to one another in the form of a conical plug-in connection and form with the elastomeric intermediate layer a component of composite material including glass fiber reinforced plastic and rubber. The intermediate layer of vulcanized-on rubber connects the two piston parts in a completely airtight manner and allows unproblematic use of the piston interior space 6 as an additional working space.

Figure 2:
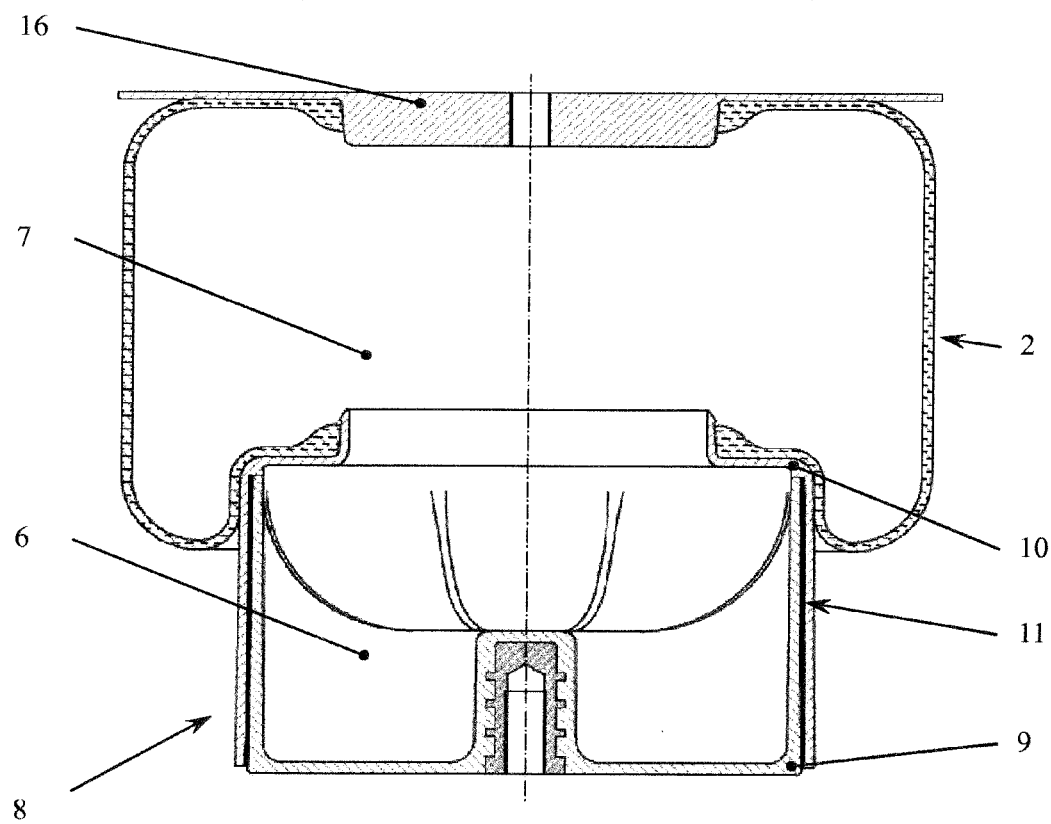
FIG. 2 shows another embodiment of a roll-off piston according to the invention.

FIG. 2 shows a further embodiment of a roll-off piston 8 according to the invention, in which the upper piston part 10 and the lower piston part 9 are connected to one another in the form of a stepped plug-in connection. Here, the upper piston part 10 and the lower piston part 9 are connected to one another with an intermediate layer 11 arranged therebetween in the form of an adhesive film, and thus form a roll-off piston 8 made up of a layered composite material comprising alternating layers made of glass fiber reinforced plastic and adhesive film. In the case of this formation, the force transmission between the upper piston part 10 and the lower piston part 9 does not take place by way of the adhesive layer/adhesive film but by way of direct contact of the molded parts at the formed projections.

In the case of the roll-off piston 8, first the lower piston part 9 was produced and provided with the adhesive film. Then the upper piston part 10 was applied.

Alternatively, the two conical piston parts 9 and 10 may also be encapsulated with an adhesive.

Figure 3:
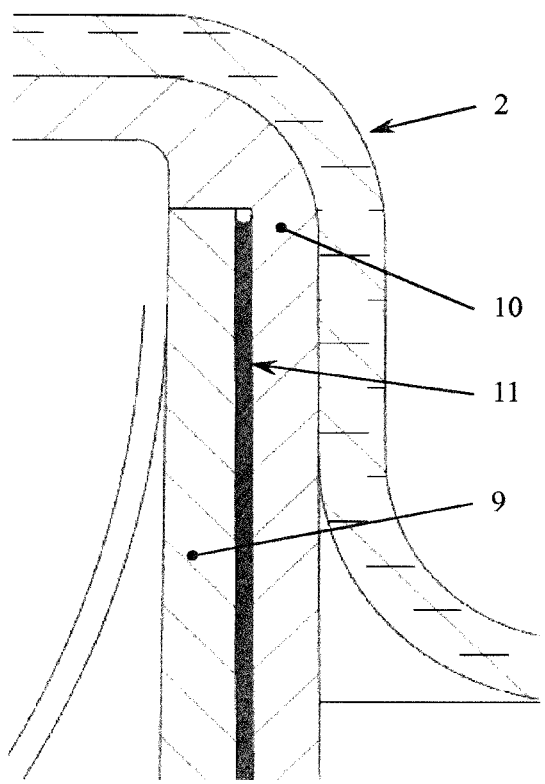
FIG. 3 shows a detail of the roll-off piston according to the invention as shown in FIG. 2; and, FIG. 4 shows a further embodiment of a roll-off piston according to the invention.

For purposes of illustration, FIG. 3 shows once again a detail of a roll-off piston 8 according to the invention, with an upper piston part 10, a lower piston part 9 and an encapsulated adhesive as intermediate layer 11. It can be seen that the upper piston part 10 is supported by way of a projection formed in the head region directly on the end face of the lower piston part 9, and thus forms a gap for the encapsulating compound. The air spring supporting force is transmitted here directly from the upper piston part 10 to the lower piston part 9, without the adhesive layer being subject to any shearing load.

Figure 4:
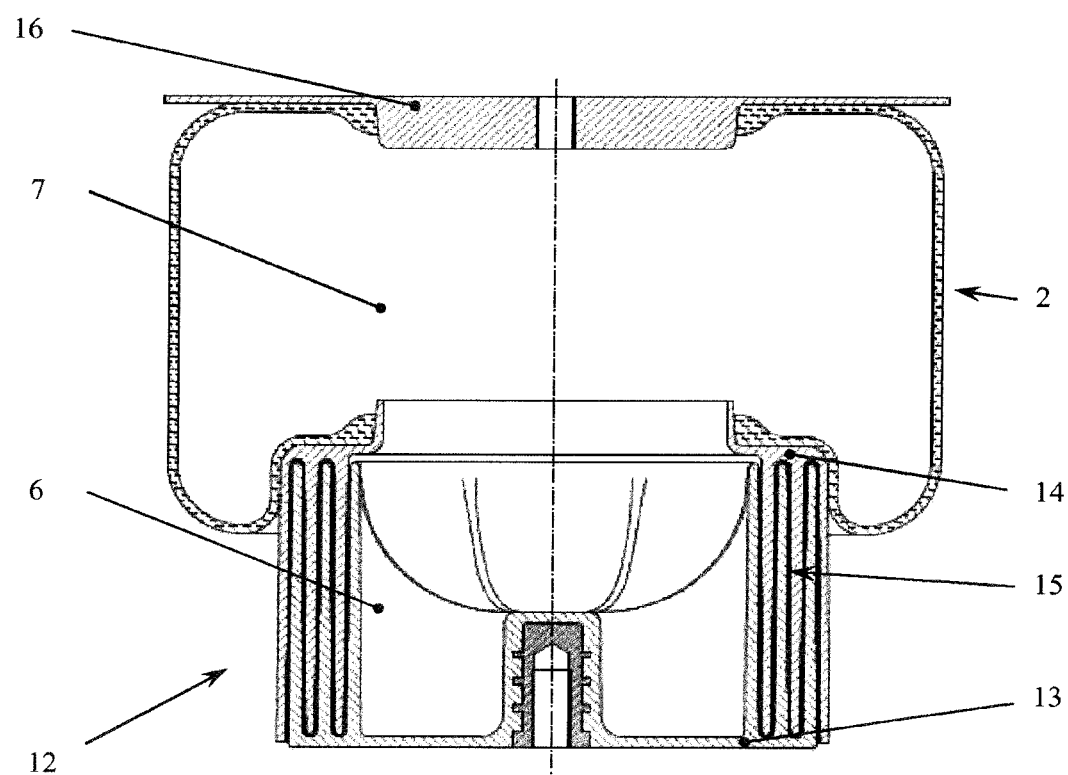

FIG. 4 shows a further embodiment of a roll-off piston 12 according to the invention, in which the upper piston part 14 and the lower piston part 13 are connected to one another in the form of a tongue-and-groove joint, here by a tongue-and-groove joint that in cross section is in the form of lamellae. Here, the upper piston part 14 and the lower piston part 13 are connected to one another with an intermediate layer 15 of elastomer adhesive arranged therebetween, and so form a roll-off piston 12 made up of a layered composite material comprising alternating layers made of glass fiber reinforced plastic and elastomeric material. In this case, the elastomer adhesive is flowable before curing, and fills the intermediate spaces between the parts of the piston.

It is understood that the foregoing description is that of the preferred embodiments of the invention and that various changes and modifications may be made thereto without departing from the spirit and scope of the invention as defined in the appended claims.

LIST OF DESIGNATIONS (Part of the Description)
1 Roll-off piston
2 Air spring rolling-lobe flexible member
3 Lower piston part
4 Upper piston part
5 Elastomeric intermediate layer (rubber vulcanized on)
6 Interior space of roll-off piston
7 Interior space of air spring
8 Roll-off piston
9 Lower piston part
10 Upper piston part
11 Elastomeric intermediate layer, formed as adhesive layer
12 Roll-off piston
13 Lower piston part
14 Upper piston parts
15 Elastomeric intermediate layer of elastomer adhesive
16 Air spring cover

What is claimed is:

1. A roll-off piston made of plastic for an air spring rolling-lobe flexible member, the roll-off piston and the air spring rolling-lobe flexible member being arranged between a sprung mass and an unsprung mass, the roll-off piston comprising:
   a first plastic piston part;
   a second plastic piston part connected to said first plastic piston part;
   each one of said plastic piston parts having at least one rim defining an edge and a curved planar surface extending from said edge;
   said plastic piston parts being inserted one into the other so as to cause corresponding ones of the curved planar surfaces thereof to conjointly define a common interface therebetween;
   an intermediate layer of elastomeric material substantially filling a space defined by said common interface between said curved planar surfaces of said first plastic piston part and said second plastic piston part; and,
   said plastic piston parts and said intermediate layer of elastomeric material conjointly defining said roll-off piston as a roll-off piston of composite material of alternating layers of plastic and elastomeric material.

2. The roll-off piston of claim 1, wherein:
   said first plastic piston part is a substantially pot-shaped and rotationally symmetrical lower piston part; and,
   said second plastic piston part is an upper piston part configured complementary to said first plastic piston part.

3. The roll-off piston of claim 1, wherein said intermediate layer is configured as an elastomeric adhesive.

4. The roll-off piston of claim 1, wherein said intermediate layer includes a rubber layer.

5. The roll-off piston of claim 1, wherein said intermediate layer includes a rubber layer vulcanized on at least one of said first plastic piston part and said second plastic piston part.

6. The roll-off piston of claim 1 further comprising:
   the air spring defining an air spring interior space;
   the roll-off piston being formed as a hollow plunger piston defining an interior space communicating with said air spring interior space;
   said first plastic piston part being a pot-shaped lower piston part; and,
   said second plastic piston part being an upper piston part connected in an airtight manner to said lower piston part via said intermediate layer.

7. The roll-off piston of claim 6, wherein said upper piston part is formed as a cover.

8. The roll-off piston of claim 2, wherein said upper piston part and said lower piston part are connected to one another via a substantially conical plug-in connection.

9. The roll-off piston of claim 2, wherein said upper piston part and said lower piston part are connected to one another via a stepped plug-in connection.

10. The roll-off piston of claim 2, wherein said upper piston part and said lower piston part are connected to one another via a tongue-and-groove joint.

11. An air spring arranged between a sprung mass and an unsprung mass, the air spring comprising:
   an air spring rolling-lobe flexible member;
   a roll-off piston made of plastic;
   said roll-off piston and the air spring rolling-lobe flexible member being arranged between said sprung mass and said unsprung mass;
   said roll-off piston including a first plastic piston part and a second plastic piston part;
   each one of said plastic piston parts having at least one rim defining an edge and a curved planar surface extending from said edge;
   said plastic piston parts being inserted one into the other so as to cause corresponding ones of the curved planar surfaces thereof to conjointly define a common interface therebetween;
   an intermediate layer of elastomeric material substantially filling a space defined by said common interface between said curved planar surfaces of said first plastic piston part and said second plastic piston part; and,
   said plastic piston parts and said intermediate layer of elastomeric material conjointly defining said roll-off piston as a roll-off piston of composite material of alternating layers of plastic and elastomeric material.

12. A method for making a roll-off piston made of plastic for an air spring rolling-lobe flexible member, the roll-off piston and the air spring rolling-lobe flexible member being arranged between a sprung mass and an unsprung mass, the roll-off piston including a first plastic piston part and a second plastic piston part connected to said first piston part; each one of said plastic piston parts having at least one rim defining an edge and a curved planar surface extending from said edge; said plastic piston parts being inserted one into the other so as to cause corresponding ones of the curved planar surfaces thereof to conjointly define a common interface therebetween; an intermediate layer of elastomeric material substantially filling a space defined by said common interface between said curved planar surfaces of said first plastic piston part and said second plastic piston part; and, said piston parts and said intermediate layer of elastomeric material conjointly defining said roll-off piston as a roll-off piston of composite material of alternating layers of plastic and elastomeric material; the method comprising the steps of:

made the first plastic piston part;

providing the first plastic piston part with a rubber layer vulcanized thereon to define said intermediate layer; and, molding the second plastic piston part onto the rubber layer via an injection molding process.

13. A roll-off piston made of plastic for an air spring rolling-lobe flexible member, the roll-off piston and the air spring rolling-lobe flexible member being arranged between a sprung mass and an unsprung mass, the roll-off piston being subject to damage during operational use thereof and comprising:

a first plastic piston part;

a second plastic piston part connected to said first plastic piston part;

each one of said plastic piston parts having at least one rim defining an edge and a curved planar surface extending from said edge;

said plastic piston parts being inserted one into the other so as to cause corresponding ones of the curved planar surfaces thereof to conjointly define a common interface therebetween;

an intermediate adhesive elastomeric material substantially filling a space defined by said common interface between said curved planar surfaces of said first plastic piston part and said second plastic piston part so as to adhesively bond said plastic piston parts to each other and so hinder fragments of plastic from separating from said roll-off piston in the event of damage thereto; and, said plastic piston parts and said layer of elastomeric material conjointly defining said roll-off piston as a roll-off piston of composite material of alternating layers of plastic and elastomeric material.

14. The roll-off piston of claim 1, wherein said intermediate layer is directly connected to said first plastic piston part and to said second plastic piston part.

15. The air spring of claim 11, wherein said intermediate layer is directly connected to said first plastic piston part and to said second plastic piston part.

16. The method of claim 12, wherein said intermediate layer is directly connected to said first plastic piston part and to said second plastic piston part.

17. The roll-off piston of claim 13, wherein said intermediate layer is directly connected to said first plastic piston part and to said second plastic piston part.

* * * * *